US012779328B2

(12) United States Patent
Xiong et al.

(10) Patent No.: US 12,779,328 B2
(45) Date of Patent: Nov. 3, 2026

(54) DATA PROCESSING METHOD BASED ON VOXEL DATA, AND SERVER, MEDIUM AND COMPUTER PROGRAM PRODUCT

(71) Applicant: Shanghai Lilith Interactive Entertainment Network Technology Co., Ltd., Shanghai (CN)

(72) Inventors: Xin Xiong, Shanghai (CN); Huanhua Liao, Shanghai (CN); Zhikai Li, Shanghai (CN); Haonan Zhao, Shanghai (CN)

(73) Assignee: Shanghai Lilith Interactive Entertainment Network Technology Co., Ltd., Shanghai (CN)

( * ) Notice: Subject to any disclaimer, the term of this patent is extended or adjusted under 35 U.S.C. 154(b) by 270 days.

(21) Appl. No.: 18/694,716

(22) PCT Filed: Sep. 29, 2022

(86) PCT No.: PCT/CN2022/122494
§ 371 (c)(1),
(2) Date: Mar. 22, 2024

(87) PCT Pub. No.: WO2023/051671
PCT Pub. Date: Apr. 6, 2023

(65) Prior Publication Data

US 2024/0399249 A1 Dec. 5, 2024

(30) Foreign Application Priority Data

Sep. 30, 2021 (CN) .......................... 202111160564.8
Sep. 30, 2021 (CN) .......................... 202111160592.X
Sep. 30, 2021 (CN) .......................... 202111163612.9

(51) Int. Cl.
*A63F 13/52* (2014.01)
*A63F 13/69* (2014.01)
*A63F 13/75* (2014.01)

(52) U.S. Cl.
CPC .............. *A63F 13/52* (2014.09); *A63F 13/69* (2014.09); *A63F 13/75* (2014.09)

(58) Field of Classification Search
None
See application file for complete search history.

(56) References Cited

U.S. PATENT DOCUMENTS

2003/0085896 A1* 5/2003 Freeman ................. G06T 15/40 345/428
2014/0267266 A1* 9/2014 Crassin ................... G06T 17/00 345/424

(Continued)

FOREIGN PATENT DOCUMENTS

CN 112891945 A 6/2021
CN 112973127 A 6/2021

OTHER PUBLICATIONS

International Search Report; China National Intellectual Property Administration; International Application No. PCT/CN2022/122494; Dec. 28, 2022; 6 pages.

(Continued)

*Primary Examiner* — Jason T Yen
(74) *Attorney, Agent, or Firm* — Taft Stettinius & Hollister LLP

(57) ABSTRACT

The method of the present disclosure includes: exporting original data of multiple types of scene elements respectively; setting an expected side length of a unit voxel, combined with the side length of the unit voxel, converting the original data of the multiple types of scene elements into voxel data respectively, where the voxel data is represented as a voxel module in the voxel scene; and according to (Continued)

relative positions of the voxel modules of all the scene elements in the pixel scene, splicing the voxel modules of all the scene elements to obtain the voxel scene.

20 Claims, 2 Drawing Sheets

(56) References Cited

U.S. PATENT DOCUMENTS

2015/0022521 A1* 1/2015 Loop .................... G06T 15/005
345/424
2018/0085670 A1* 3/2018 Short .................. A63F 13/5372
2018/0264365 A1* 9/2018 Soederberg ........... A63F 13/655

OTHER PUBLICATIONS

Chinese First Office Action; The State Intellectual Property Office of People's Republic of China; Chinese Patent Application No. 202280020323.X; May 30, 2026; 11 pages with English translation.
Chinese Search Report; The State Intellectual Property Office of People's Republic of China; Chinese Patent Application No. 202280020323.X; May 30, 2026; 1 page.

* cited by examiner

DATA PROCESSING METHOD BASED ON VOXEL DATA, AND SERVER, MEDIUM AND COMPUTER PROGRAM PRODUCT

CROSS-REFERENCE TO RELATED APPLICATIONS

This application is a U.S. National Phase of International PCT Application No. PCT/CN2022/122494 filed on Sep. 29, 2022, which claims priority to Chinese Patent Application Serial No. 202111160564.8 filed on Sep. 30, 2021, Chinese Patent Application Serial No. 202111160592.X filed on Sep. 30, 2021, and Chinese Patent Application Serial No. 202111163612.9 filed on Sep. 30, 2021. The contents of those applications are incorporated herein by reference in their entireties.

TECHNICAL FIELD

The present invention relates to the technical field of game data processing, in particular, to a data processing method and server based on voxel data, a medium, and a computer program product.

BACKGROUND

A game scene is a collection of all scene elements in a virtual space in a video game, including contents such as map landforms, buildings, game characters, and equipment items. An interface of the game scene seen by a game user is often displayed in the form of a pixel scene, that is, the contents of the game scene are displayed on a display screen according to a pixel data format.

In a multiplayer competitive game, an AI functions often need to be added, that is, one or more simulated players are added in a game, and behaviors of the simulated players are calculated by a server.

In the existing technical means, behavior trees are commonly used to calculate AI behaviors. If this calculation method is performed by using a CPU, traversal of tree data structures and detection and navigation tasks that consume CPU performance need to be performed. For high real-time competitive games, calculation efficiency is low and business needs cannot be met.

SUMMARY

In order to overcome the technical defects, an objective of the present invention is to provide a data processing method and server based on voxel data, a medium, and a computer program product with higher operation efficiency.

The present invention discloses a data processing method based on voxel data, original data of a game scene constitutes a pixel scene, the pixel scene includes multiple different data types of scene elements, and the method includes:

- exporting the original data of the multiple types of scene elements respectively;
- setting an expected side length of a unit voxel, combined with the side length of the unit voxel, converting the original data of the multiple types of scene elements into voxel data respectively, where the voxel data in the voxel scene is represented as a voxel module; and
- according to relative positions of the voxel modules of all the scene elements in the pixel scene, splicing the voxel modules of all the scene elements to obtain the voxel scene.

Preferably, the scene element includes at least one of terrain, vegetation, a building and an outdoor decoration;

- the exporting the original data of the multiple types of scene elements respectively includes:
- exporting 3D model file format data and coordinate information of the outdoor decoration and the building;
- exporting comma-separated value file format data of the vegetation; and
- orthogonally capturing by a depth camera to export a picture of the terrain, where the picture includes surface height data of the terrain.

Preferably, the setting an expected side length of a unit voxel, and combined with the side length of the unit voxel, converting the original data of the multiple types of scene elements into voxel data respectively includes:

- converting the 3D model file format data of the outdoor decoration and the building into voxel data using a “read_triangular_mesh” function and a “create_from_triangular_mesh” function in an open-source library;
- obtaining a size of a collision body of the vegetation, combined with the side length of the unit voxel, obtaining a quantity of voxels that the vegetation needs to occupy in the voxel scene and a voxel shape by calculation; and
- according to the picture in which the surface height data of the terrain is stored, performing sampling point by point according to the side length of the unit voxel to convert the surface height data of the terrain into voxel data.

Preferably, the method further includes:

- obtaining a voxel area within a target space range of a target object by clipping in the voxel scene, and using the voxel area as an input of a neural network in the form of a three-dimensional tensor, to obtain spatial features of the target object.

Preferably, the obtaining a voxel area within a target space range of a target object by clipping in the voxel scene, and using the voxel area as an input of a neural network in the form of a three-dimensional tensor, to obtain spatial features of the target object includes:

- taking the target object as the center, obtaining a voxel cube in a surrounding space range of the target object by clipping, and using the voxel cube as an input of a neural network in the form of a three-dimensional tensor, to obtain spatial features surrounding the target object.

Preferably, the obtaining a voxel area within a target space range of a target object by clipping in the voxel scene, and using the voxel area as an input of a neural network in the form of a three-dimensional tensor, to obtain spatial features of the target object includes:

- in a front space range of the target object, obtaining a first voxel cuboid by clipping, and using the first voxel cuboid as an input of the neural network in the form of a three-dimensional tensor, to obtain spatial features in front of the target object, and
- in the front space range of the target object, obtaining a second voxel cuboid by clipping, where the length of the second voxel cuboid is much greater than the length of the first voxel cuboid, and using the second voxel cuboid as an input of the neural network in the form of a three-dimensional tensor, to obtain spatial features far in front of the target object.

Preferably, the obtaining a voxel area within a target space range of a target object by clipping in the voxel scene, and using the voxel area as an input of a neural network in the form of a three-dimensional tensor, to obtain spatial features of the target object includes:

using the voxel data in the voxel scene for a specified target object and a field of view, obtaining a depth map with a resolution of M*N through ray detection, and using the depth map as an input of the neural network to obtain spatial features of the target object.

Preferably, the using the voxel data in the voxel scene for a specified target object and a field of view, and obtaining a depth map with a resolution of M*N through ray detection includes:

generating a viewing cone in the direction of the field of view, where the end of the viewing cone is a curved surface, and the curved surface includes M*N points in the voxel scene; and taking the target object as a starting point and taking the M*N points as ending points to form M*N paths, and performing ray detection on the M*N paths along a direction from the starting point to the ending point until a solid point in the path is detected; where detection results of the M*N paths constitute the depth map.

Preferably, the performing ray detection on the M*N paths along a direction from the starting point to the ending point until a solid point in the path is detected includes:

Where the path includes a starting point and an ending point;

obtaining n points that the path passes through in the voxel scene by calculation; and in a GPU, simultaneously performing calculation on the M*N paths, to reach a point corresponding to each point in the voxel scene by indexing.

Preferably, the method further includes:

determining whether there is a fraud in a behavior of a game object, where a game processing process of the game object is carried out in the voxel scene, the voxel scene includes the game object and a field of view scene of the game object, and each client is corresponding to one or more game objects, and the determining whether there is a fraud in a behavior of a game object includes:

calculating, by a server side, the field of view scene that should be obtained by the game object at the current time, and sending the field of view scene to the client in real time;

based on a decision-making behavior that has occurred for the game object, determining whether the decision-making behavior meets an occurrence condition in the field of view scene, and if the occurrence condition is not met, it is considered that there is a fraud behavior; and recording a game account corresponding to the game object and the fraud behavior.

Preferably, an area range of the field of view scene is an area range of the viewing cone of the game object; and within the area range of the viewing cone, if it is determined, through ray detection, that there is blockage in a path between the game object and another game object, then such another game object is not displayed.

Preferably, based on a decision-making behavior that has occurred for the game object, the determining whether the decision-making behavior meets an occurrence condition in the field of view scene includes:

determining, through ray detection, whether a path between the game object and another game object is smooth, and if the path is smooth, the decision-making behavior meets the occurrence condition; or if the path is not smooth, the decision-making behavior does not meet the occurrence condition.

Preferably, the calculating the field of view scene that should be obtained by the game object at the current time includes:

in the field of view scene, obtaining types of all dynamic game objects and offset coordinates of a contour point of each type of dynamic game object relative to the center point of the game object;

obtaining updated coordinates of a refreshed contour point by calculation according to the offset coordinates of the center point of the dynamic game object at the end of the latest preset period and the contour point; and writing the updated coordinates of all contour points into the voxel data after the dynamic game object is refreshed, and erasing the voxel data of original positions of all contour points before the dynamic game object is refreshed, and completing dynamics refreshing of all game objects in the field of view scene, to obtain the field of view scene after calculation and refreshing.

Preferably, based on a decision-making behavior that has occurred for the game object, the determining whether the decision-making behavior meets an occurrence condition in the field of view scene, and if the occurrence condition is not met, considering that there is a fraud behavior includes:

obtaining a navigation path and a traveling manner between the game object and a destination by calculation, where a quantity of navigation paths is one or more, and a quantity of the traveling manners is one or more; and determining whether the navigation path includes an actual walking path of the game object, and determining whether the traveling manner supported on the actual walking path includes a traveling manner actually adopted by the game object, if not, considering that there is a fraud behavior.

Preferably, the obtaining a navigation path and a traveling manner between the game object and a destination by calculation includes:

in a x, y, z three-dimensional space of the voxel scene, taking a base plane of z=z', where there are multiple base points on the base plane; forming multiple base columns by using the base point as a bottom point and using a z coordinate of the base point as a height, where there are L element points on each base column;

accessing all the base columns in parallel in the GPU, traversing each element point on the base column in each parallel thread, finding a voxel scene coordinate point corresponding to the element point by indexing according to the voxel data, and determining whether the voxel scene coordinate point is a hollow point or a solid point;

collecting continuous hollow point segments on each base column, and if a height of the continuous hollow point segments is greater than or equal to a first preset height, defining the continuous hollow point segments as a voxel layer; and obtaining a positional relationship between the voxel layer on which the game object is currently located and each voxel layer on the adjacent base column by calculation, to obtain a traveling manner between the voxel layer on which the game object is currently located and each voxel layer on the adjacent base column.

Preferably, the step of determining through ray detection includes:

obtaining n points $(a_1, b_1, c_1)$, $(a_2, b_2, c_2)$, . . . , $(a_n, b_n, c_n)$ passed in the voxel scene by a ray path formed by the game object $(x_1, y_1, z_1)$ and another game object $(x_2, y_2, z_2)$ by calculation;

in the GPU, simultaneously performing calculation on the n points: finding the n points in the voxel scene by indexing according to the coordinates in the voxel scene, and checking whether the points are solid points; and if it is detected that there is a solid point in the n points, then there is a blockage in the path between the game object and another game object; if it is detected that there is no solid point in the n points, then the path between the game object and another game object is smooth.

Preferably, the step of determining through ray detection further includes: performing ray detection on m paths in the GPU:

where the m paths include m starting points and m ending points; simultaneously performing calculation on and obtaining n points passed by each path in the voxel scene;

simultaneously performing calculation on the n points in the m paths: finding a point corresponding to each point in the voxel scene by indexing according to the coordinates in the voxel scene, and detecting whether the corresponding point is a solid point; and if it is detected that there is a solid point among the n points, there is a blockage in the path; otherwise, the path is smooth, to obtain detection results of the m paths.

Preferably, the method further includes:

where a detection area includes x detection targets and y nodes, performing dynamic programming on the detection area, including:

simultaneously performing ray detection on x*y paths formed by the x detection targets and y nodes, and saving detection results; and retrieving the detection results of different paths at different times for the detection area to perform the dynamic programming.

Preferably, the method further includes:

the performing dynamic programming for multiple detection areas includes:

simultaneously performing ray detection on x*y paths in different detection areas, and saving the detection results to form a detection result table obtained by division of the detection areas; and when dynamic programming is performed on a detection area, retrieving the detection result of the detection area from the detection result table.

The present invention further discloses a data processing server based on voxel data, where original data of a game scene constitutes a pixel scene, and the pixel scene includes multiple different data types of scene elements, and the server includes:

an exporting module, configured to export original data of multiple types of scene elements respectively;

a conversion module, configured to: set an expected side length of a unit voxel, and combined with the side length of the unit voxel, convert the original data of multiple types of scene elements into voxel data respectively, where the voxel data is represented as a voxel module in the voxel scene; and a splicing module, configured to: splice the voxel modules of all the scene elements according to relative positions of the voxel modules of all the scene elements in the pixel scene to obtain the voxel scene.

The present invention further discloses a computer-readable storage medium for storing a data processing instruction based on voxel data, where original data of the game scene constitutes a pixel scene, and the pixel scene includes multiple different data types of scene elements, and when the instruction is executed, the following steps are performed:

exporting original data of multiple types of scene elements respectively;

setting an expected side length of a unit voxel, and combined with the side length of the unit voxel, converting the original data of multiple types of scene elements into voxel data respectively, where the voxel data in the voxel scene is represented as a voxel module; and according to relative positions of the voxel modules of all the scene elements in the pixel scene, splicing the voxel modules of all the scene elements to obtain the voxel scene.

The present invention further discloses a computer program product, including a computer-executable instruction, where the instruction is executed by a processor to implement the following steps:

exporting original data of multiple types of scene elements respectively;

setting an expected side length of a unit voxel, and combined with the side length of the unit voxel, converting the original data of the multiple types of scene elements into voxel data respectively, where the voxel data in the voxel scene is represented as a voxel module; and according to relative positions of the voxel modules of all the scene elements in the pixel scene, splicing the voxel modules of all the scene elements to obtain the voxel scene.

After adopting the above technical solution, compared with the prior art, the technical solution has the following beneficial effects:

1. For calculation of spatial data, pixel data is converted into voxel data, which is highly compatible with GPU computing. Compared with the existing CPU computing mode, the performance of GPU-based data computing solution is 2 to 3 orders of magnitude higher than that of the CPU-based data computing mode. Because all calculations are based on the voxel scene, on a server platform integrated with a GPU, a large number of parallel calculations in the voxel scene are very fast, so that the server can bear a large amount of calculation load. Voxel data is used as an input of the neural network, so that AI behaviors obtained by calculation can be more refined, intelligent, fast-responsive, and close to human behaviors. Voxel data is used to perform high-performance ray detection to perceive an environment, and have high computing efficiency.
2. Verification calculation is performed by a server instead of a client to eliminate the possibility of a fraud behavior of the client. Specifically, clipping is performed for a field of view of each game object, that is, only field of view data that the game object should see is sent to the game object, while the client only calculates the spatial data in the field of view scene. Technologies such as ray detection are used to determine whether the decision of the game object is reasonable in real time, and combination of verification calculation and ray detection can prevent game fraud in advance and block game fraud in the middle of the game.

3. Ray detection is performed by using voxel data to generate a depth map, and the depth map is used as feature extraction of the neural network, so that a series of subsequent tasks such as spatial object segmentation, spatial object classification, and behavioral reinforcement learning can be performed.

DETAILED DESCRIPTION OF EMBODIMENTS

Figure 1:
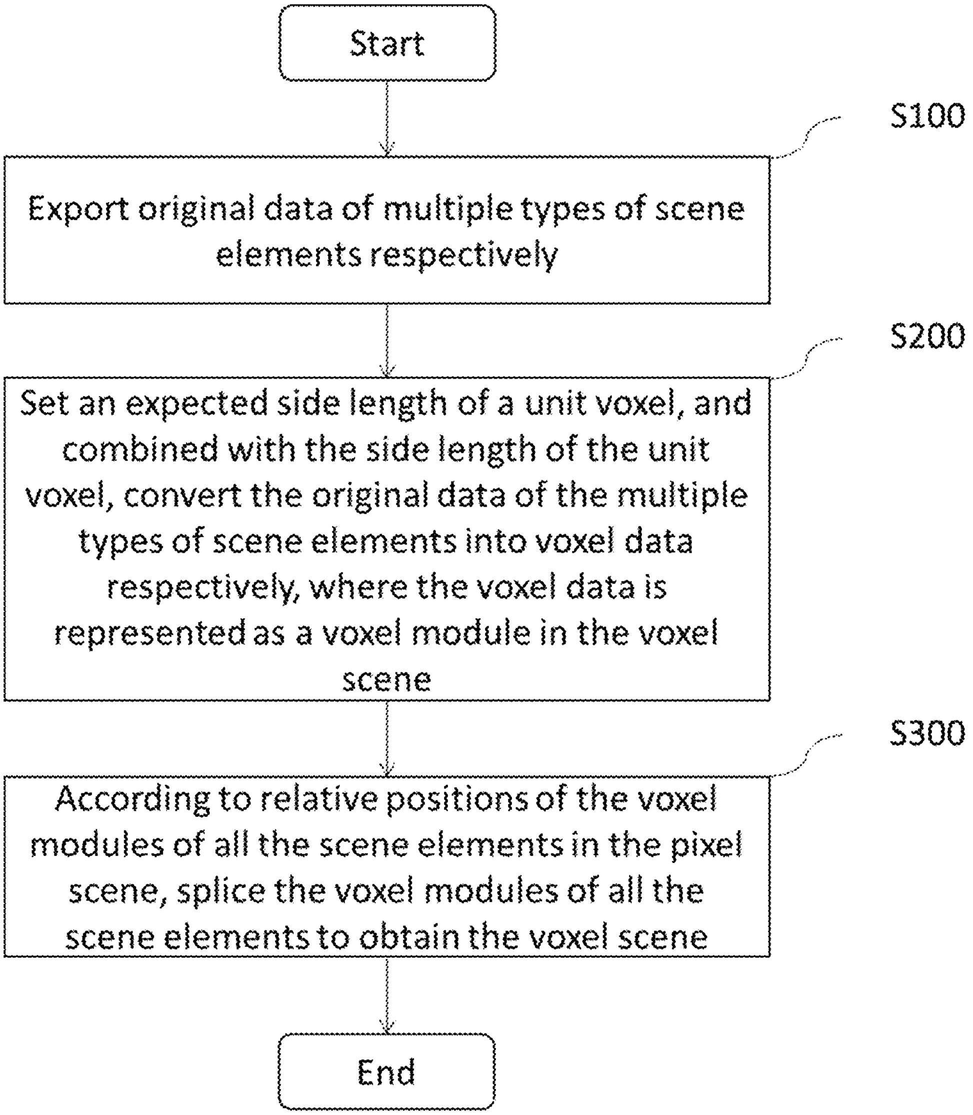
FIG. 1 is a flowchart of a data processing method based on voxel data provided by the present invention.

Advantages of the present invention are further described below with reference to the drawings and specific embodiments.

The exemplary embodiments are described in detail herein, and examples thereof are shown in the accompanying drawings. When the following description involves the drawings, unless otherwise indicated, the same numbers in different drawings indicate the same or similar elements. The implementations described in the following exemplary embodiments do not represent all implementations consistent with the present disclosure. Rather, the implementations are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should further be understood that the term "and/or" as used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when" or "while" or "in response to determining".

In the description of the present invention, it should be understood that the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, and are only for the convenience of describing the present invention and simplifying the description, and do not indicate or imply that the pointed device or element must have a specific orientation, or be constructed and operated in a specific orientation, and therefore cannot be understood as a limitation of the present invention.

In the description of the present invention, unless otherwise specified and limited, it should be noted that the terms "installed", "joint", and "connection" should be understood in a broad sense. For example, the connection can be a mechanical connection or an electrical connection, or may be internal communication between two elements, or may be a direct connection or an indirect connection through an intermediate medium. For the person of ordinary skill in the art, the specific meaning of the above terms can be understood according to specific conditions.

In the subsequent descriptions, a suffix such as "module", "component", or "unit" used to represent an element is merely used to facilitate description of the present invention, and does not have specific meanings. Therefore, "module" and "component" can be mixed for using.

Regarding a voxel scene, a voxel (a portmanteau of the words volumetric and pixel) is a volume element, and a volume described as voxels can be visualized either by volume rendering or by the extraction of polygon isosurfaces that follow the contours of given threshold values. A voxel is a smallest unit of digital data in division of a three-dimensional space, and the unit voxel mentioned in the present invention can be understood as a single voxel. Voxels are used in fields such as 3D imaging, scientific data, and medical imaging, and is conceptually analogous to a pixel, which is the smallest unit of a two-dimensional space, and the pixel is used in image data of a two-dimensional computer image. Some true 3D displays use the voxels to describe their resolution, for example, a display that can display 512×512×512 voxels.

In the field of 3D imaging technologies, a CPU-based computing mode is usually adopted, that is, various logical task operations and data preprocessing are performed on a CPU. However, the GPU is more suitable for concurrent data operations, such as image rendering. The combination effect of the existing spatial data structure and the GPU is not ideal, and the existing spatial data structure takes pixel data as the mainstream, and consequently the high-concurrency computing performance of the GPU cannot be reflected. In the present invention, the pixel data used for 3D imaging is converted into voxel data, which is highly compatible with the high-concurrency computing characteristics of the GPU, and various operations are performed. Compared with the existing CPU computing mode, the performance of the GPU-based data computing solution is 2 to 3 orders of magnitude higher than that of the CPU-based data computing mode. Therefore, the voxel data is used for high-performance ray detection to sense the environment, and calculation efficiency is high.

Specifically, referring to FIG. 1, the present invention provides a specific embodiment of a data processing method based on voxel data. Original data of a game scene constitutes a pixel scene, and the pixel scene includes multiple different data types of scene elements. The method includes the following steps:

S100: Export original data of multiple scene elements respectively.

S200. Set an expected side length of a unit voxel, and combined with the side length of the unit voxel, convert the original data of multiple scene elements into voxel data respectively, where the voxel data is expressed as a voxel module in the voxel scene.

S300. According to relative positions of the voxel modules of all scene elements in the pixel scene, splice the voxel modules of all scene elements to obtain a voxel scene.

Figure 2:
FIG. 2 is a pixel scene of the prior art.

In a preferred embodiment of the present invention, the game scene is a game world created by a UE4 game engine. Referring to FIG. 2, in this game world, the scene element includes terrain, vegetation, buildings and outdoor decorations. The terrain may be such as slopes, hills, and rivers. Vegetation may be such as trees, flowers and grass, and shrubs. The buildings may be such as houses and warehouses. The outdoor decorations may be such as oil tanks and platforms. All scene elements in FIG. 2 are displayed in the form of pixels, and each element is composed of pixel blocks, that is, the game scene is described and displayed by using pixel data, and the pixel scene is a way of expressing the game scene.

However, data types used by different scene elements are different when the scene elements are constructed. According to the types and characteristics of the scene elements, the original data of different scene elements are exported from a UE4 game engine in different ways. Specifics are as follows:

The outdoor decorations and the buildings belong to an Actor type including StaticMesh in the UE4 game engine, OBJ files can be directly exported, and coordinate information of Actors can be simultaneously exported. The OBJ files are 3D model files.

The vegetation does not belong to an independent Actor type in UE4. Therefore, coordinates and shapes need to be recorded, and the coordinates and shapes are exported as a CSV information file. The CSV information file is a comma-separated value file.

Only surface height information is used for the terrain in the voxel world, and terrain image data can be exported by adopting a method of orthogonally shooting with a depth camera in the present invention.

The export methods of the multiple types of original data can be implemented by referring to the description document of the UE4 game engine, and are the technical means mastered by persons skilled in the art.

Because of different types of scene elements and respective characteristics, different conversion methods are required to convert various types of original data of different scene elements into voxel data represented as voxel modules in the game scene. First, an expected side length of the unit voxel needs to be set, a voxel module includes one or multiple unit voxels, and combined with the side length of the unit voxel, the data of multiple scene elements are respectively converted into voxel data. Specifics are as follows:

For an OBJ (3D model) file, the OBJ file may be directly converted into voxel data (a voxel module) with the help of a “read_triangle_mesh” (read_triangle_mesh) function and a “create_from_triangle_mesh” (create_from_triangle_mesh) function in an open source library OPEN3D. OPEN3D is not an open source library limited by the present invention, and other open source libraries that can implement the above two functions can also be used for data conversion.

For the vegetation, according to a size of a collision body of the vegetation and the side length of the voxel, the number of voxel modules that the vegetation occupies in the voxel world and a shape of the voxel module need to be directly obtained by calculation.

The terrain occupies only one layer in the voxel world. Referring to an area D in FIG. 3, according to image data in which height information is stored, point-by-point sampling is performed according to the side length of the unit voxel to convert the height information into voxel data (voxel module).

So far, all the data for building the voxel scene has been obtained, and finally the voxel modules of all scene elements need to be spliced to obtain the voxel scene of all scene elements.

The voxel scene is represented as a large number of three-dimensional coordinate points in the program. The principle of splicing the voxel modules is actually to integrate the coordinate point information representing the voxel modules into the same data structure according to the relative positions of the voxel modules in the game map. However, the UE4 game engine contains position information and rotation information of each module. Therefore, when splicing is performed, special attention needs to be paid to a problem that rules of Euler angle rotation transformation of the 3D model are inconsistent in different systems.

Figure 3:
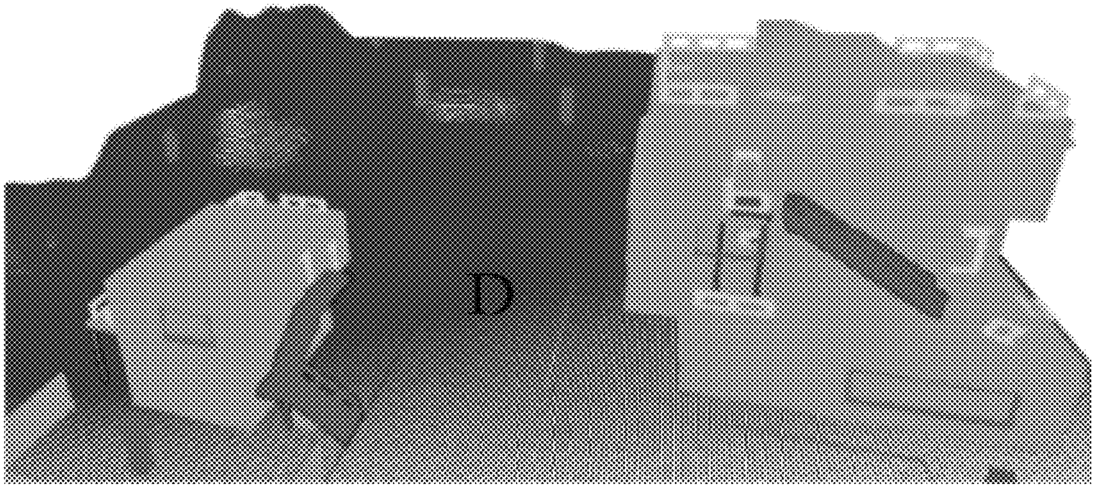
FIG. 3 is a voxel scene converted from the pixel scene in FIG. 2 provided by the present invention.

After splicing, the voxel scene shown in FIG. 3 is obtained. In this voxel scene, three-dimensional tensors are used to fully express spatial information of the three-dimensional world, sampling accuracy determines the spatial resolution, and the voxel data is used to record the game scene, that is, the voxel scene is a representation of the game scene. Based on the characteristics of the data format of the voxel scene, the data is flat vector data, which is very suitable for GPU computing, and the GPU performs computing on the voxel scene, so that the computing speed is greatly improved compared with the way of using the CPU in the prior art.

Preferably, based on that the pixel scene is converted into a voxel scene, a target space range of the target object is clipped, and the target space range is used as an input of the neural network. The spatial feature is obtained by using a neural network, and the spatial feature includes information included in the space, for example, whether voxel points within the target space range are solid points. The target object can be a game object or a scene element. The game object can be a character controlled by a player or a character controlled by AI.

Specifically, a voxel area within the target space range of the target object is obtained by clipping in the voxel scene, and the voxel area is used as an input of the neural network in the form of a three-dimensional tensor to obtain spatial features of the target object.

The target space range includes a first spatial feature range, a second spatial feature range . . . the $N^{th}$ spatial feature range. The target space range may be one of the spatial feature ranges, or a combination of multiple spatial feature ranges. The present invention provides a preferred embodiment, and three spatial feature ranges are included. The first spatial feature range is a surrounding space range, that is, the range of adjacent spaces around the target object. The second spatial feature range is a near front space range, that is, a space range within a certain distance in front of the target object. The third space feature range is a far front space range, that is, a space range beyond a certain distance in front of the target object. Both the near front space range and the far front space range belong to the front space range. In conclusion, it is obvious that the target space range does not include a space range of the target object itself. Specific application examples of the above surrounding space range, the front space range, the near front space range, and the far front space range are as follows:

1. Regarding an application example of the surrounding space range: The target object is used as a center, a voxel cube within the surrounding space range of the target object is obtained by clipping, and the voxel cube is used as an input of the neural network in the form of a three-dimensional tensor, to obtain spatial features surrounding the target object. The voxel cube obtained by clipping is a combination of several unit voxels. The voxel cube is used as an input of the neural network in the form of three-dimensional tensor, and a model of the neural network can be selected according to a specific application requirement, such as a convolutional neural network. An output result obtained through the calculation of the neural network is a set of vector data, and the vector data is the spatial features surrounding the target object.

In this example, the target object can be understood as a character in the game scene. During the game, the character needs to know the equipment that can be picked up around the character, that is, environment information around the character needs to be captured, and equipment information is extracted and identified from the environment information. The environment information is usually limited in a preset range. For example, when there is equipment information within two meters around the character, it is notified that there is equipment that can be picked up around the character.

In this case, the size of the cube is corresponding to a value of “two meters”.

The reason why “corresponding” rather than “equal” is described is that the size of screen data of the game scene may not be exactly the same as the size actually perceived by the character, and there may be a corresponding relationship of enlargement or reduction.

2. Regarding an application example of the front space range: In front of the target object, a first voxel cuboid is obtained by clipping, and the first voxel cuboid is used as an input of the neural network in the form of a three-dimensional tensor, to obtain spatial features in the space range in front of the target object. The first voxel cuboid obtained by clipping is a combination of multiple unit voxels, and the first voxel cuboid may be a wider cuboid or may be a slender cuboid.

In this example, the target object can also be understood as a character in the game scene. The character needs to recognize a behavior action of an enemy in front of the field of vision, so that a behavior selection of the character is made according to the behavior action, for example, action dodge in a fighting game; for another example, missile dodge in a scene game. That is, environment information in front of the field of vision of the character and enemy behavior information need to be captured, and an action that can be cooperated with or avoided is extracted or identified from the environment information and the enemy behavior information within the environmental range. The environment information and enemy behavior information are usually limited in a preset range. For example, when there is missile information within 50 meters in front of the field of vision of the character, the character is informed that relative dodge needs to be performed or another defensive action needs to be adopted. In this case, the length dimension of the cuboid is corresponding to the value of “fifty meters”.

3. Regarding an application example of the far front space range: In front of the target object, a second voxel cuboid is obtained by clipping. The length of the second voxel cuboid is much greater than the length of the first voxel cuboid. For example, the second voxel cuboid is a slender cuboid, and the length of the second voxel cuboid has an order-of-magnitude multiple relationship with the length of the first voxel cuboid. The second voxel cuboid is used as an input of the neural network in the form of a three-dimensional tensor, to obtain spatial features of the target object in the far front space range (that is, a front distance location). The second voxel cuboid obtained by clipping is a combination of several unit voxels. The second voxel cuboid can be used independently or in combination with the first voxel cuboid.

In this example, the target object is also a character in the game. The character who holds a gun needs to use a telescope sight to obtain a distant view. Therefore, the environment range that needs to be extracted in this case should be farther to be corresponding to a distant aiming object. In this case, a length dimension of the slender cuboid is corresponding to a distance between the distant aiming object and the character.

When setting is made, the length dimension of the slender cuboid can be set to be corresponding to the farthest distance that the telescope sight can see, so that it can ensure that the clipped area can meet the requirement of the sight distance of the telescope sight.

In addition to directly applying voxel data to the input of the neural network, because the format of the voxel data is standardized and tidy, and calculation, especially parallel calculation, is easily performed, the voxel data is applied to ray detection by GPU in the present invention, and a depth map is generated through ray detection, and then the depth map is used as feature extraction of the neural network for inputting, so that the performance of voxel data can be better utilized.

Specifically, for the specified target object and field of view, the voxel data in the voxel scene is used to obtain a depth map with a resolution of M*N through ray detection, and the depth map is used as an input of the neural network to obtain spatial features of the target object.

Preferably, the generation of the depth map specifically includes the following:

1) A viewing cone is generated in the direction of the field of view. The end of the viewing cone is a curved surface. In the voxel scene, the curved surface includes M*N points.

2) The target object is used as a starting point, and M*N points are used as the ending points to form M*N paths, and ray detection is performed on the M*N paths along a direction from the starting point to the ending point until a solid point in the path is detected, and a detection result is represented as a pixel of the path.

3) Detection results of the M*N paths form a depth map.

It should be noted that the viewing cone is an abstract conical spatial range where the line of sight is emitted from the eyes of a “person” as one of the characters in the game scene. The viewing cone is usually a plane (a surface with a curvature of 0). In the voxel scene, for the convenience of calculation, calculation is usually based on a spherical coordinate system. In the spherical coordinate system, the viewing cone is a curved surface.

During a ray detection process, along a direction from the starting point to the ending point (it can also be understood as from near to far), if a solid point is detected for the first time at a certain position, it indicates that the path is blocked at this position, and a depth of a field of view ends at this position. In this way, a depth map is formed.

Preferably, specific steps of ray detection are as follows:

1) A starting point $(x_1, y_1, z_1)$ and an ending point $(x_2, y_2, z_2)$ are set.

2) n points $(a_1, b_1, c_1)$, $(a_2, b_2, c_2)$ . . . $(a_n, b_n, c_n)$ through which the path passes in the voxel scene are obtained by calculation.

3) In the GPU, calculation is simultaneously performed on M*N paths to reach a point corresponding to each point in the voxel scene by indexing, and whether the corresponding point is a solid point is determined.

A path between the starting point ($x_1$, $y_1$, $z_1$) and the ending point ($x_2$, $y_2$, $z_2$) is on the same straight line. For ray detection, a ray is emitted from the starting point ($x_1$, $y_1$, $z_1$) to the ending point ($x_2$, $y_2$, $z_2$), and a ray path is formed between two points.

During the ray detection process, if a solid point is detected, that is, an attribute value of the voxel coordinate point is 1, it indicates that the path is blocked or not passable; if there is no solid point, that is, an attribute value of the voxel coordinate point is 0, it indicates that the path is unblocked and passable. Passage can be understood as passage in a spatial sense of the character, and can also be understood smoothness of signal transmission.

For example, during the game, there is a need to determine whether the character can hit a distant target with a gun. The starting point of detection is the character, and the ending point is the distant target. If the detection result is that there is no obstacle, it indicates that under the current aiming path, the distant target can be hit by normal shooting. If the detection result is there is an obstacle, it indicates that under the current aiming path, the distant target cannot be hit by normal shooting, either.

The following provides an example of using voxel data to obtain a depth map with a resolution of 320*180 for a pair of a specified character and a field of view:

1) A viewing cone is generated according to the direction of the field of view, and a curved surface at an end of the viewing cone is corresponding to 320*180 points in the voxel data.
2) The specified character is used as a starting point, the above 320*180 points are used as the ending points, and 320*180 detection rays are defined.
3) 320*180 pairs of starting points and ending points are put into an array A (the number of array elements is 320*180, and each array element includes the starting point and the ending point).
4) In the GPU, calculation is simultaneously performed on the pairs of starting point and ending point in the array A, that is, 320*180 threads are concurrent, and each thread executes the following process:
   a. The conventional ray detection method is used to calculate the n points ($a_1$, $b_1$, $c_1$), ($a_2$, $b_2$, $c_2$), . . . , ($a_n$, $b_n$, $c_n$) through which a path from the starting point to the ending point that needs to pass in the voxel world;
   b. A point corresponding to each point in the voxel data is found by indexing according to the coordinates in the voxel scene from near to far, and whether the corresponding point is a solid point is determined;
   c. When the $m^{th}$ point encountered is a solid point, m is written into the result, and if all the points are hollow, n is written into the result.
5) All results are collected to obtain a depth map.

Because there is a need to detect where there is a blockage in the ray detection process of obtaining the depth map, that is, the depth is obtained and the detection is stopped, and it can also be understood as a pixel map.

By determining different game targets and fields of view, different spatial features can further be extracted and input into the neural network to perform spatial object segmentation, spatial object classification and behavior reinforcement learning.

In addition, the method further includes: determining whether a behavior of the game object is fraudulent.

The game processing process of the game object is carried out in a voxel scene. The voxel scene includes a game object and a field of view scene of the game object. The game object moves and executes a decision-making behavior in a field of vision scene. The field of view scene of the game object is a collection of scene elements within the field of view scene of the game object. The data of the voxel scene is processed by a server and a client, and the server and the client are connected in a wireless or wired manner. The client can be a device such as a mobile phone, a tablet computer, and a computer, and the server is a server or a server group. Usually each client correspondingly operates a game object. However, for some game types, a client may correspondingly operate multiple game objects. A voxel scene is a three-dimensional space composed of unit voxels. In this three-dimensional space, various spatial elements (such as terrain, buildings, game characters, and equipment props) are constructed by using the data format of unit voxels.

The method for determining the behavior of the game object of the present invention mainly includes performing a preventive behavior and a halfway blocking behavior on a game fraud behavior. Specifics are as follows:

1) The server side calculates a field of view scene that the game object should obtain at the current time, and sends the field of view scene to the client in real time.
2) Based on the decision-making behavior that has occurred for the game object, it is determined whether the decision-making behavior meets an occurrence condition in the field of view scene, and if the occurrence condition is not met, it is considered that there is a fraud behavior.
3) A game account and a fraud behavior corresponding to the game object are recorded.

For an idea of preventing the fraud behavior in this embodiment, all the relevant game data of the game objects (that is, player data) is placed on the server side, the game data of each game object is calculated on the server side, and then the game data is delivered to the client, the game data received by the client is only data that the game object should receive, and there is no data that the game object should not receive.

It can be understood as follows (not limited to): When a game session is in progress, character data of this game object, character data of another game object, data of the field of view scene, map data, configuration data, etc. are required. If all the above game data are delivered to the client, and calculation is separately performed at each client to implement the progress of the game, there is a risk that a user maliciously obtains the above data and destroys the rules of the game. For example, a user obtains a perspective function by using a cheating program on the client, and another game object behind an obstacle can be seen in the field of view of the game object of the user. However, if all the above data are placed on the server side, calculation is performed on the server side, and the data actually required by each game object is sent to a corresponding client, and unnecessary data is not delivered, the user can be prevented from maliciously obtaining and using the data, thereby avoiding the occurrence of game fraud from the source, that is, even if the user uses the cheating program on the client, the game object behind the obstacle cannot be seen in the field of vision, because the data of the game object behind the obstacle is not delivered to the client.

It should be noted that the game data delivered by the server to the client mentioned in the present invention is dynamic data required to construct the overall game scene, but not all the data of the overall game scene. It can be understood that the game data includes data that can change dynamically, such as other game objects and game props that can be picked up; does not include existing scene data that does not change, such as terrain and vegetation. The size of the dynamic data is far smaller than the total data size of the overall game scene. In this way, load on communication data between the server and the client can be reduced, and real-time data communication can be supported during the running of the game.

In addition to the obtaining of data, the game fraud behavior further includes a behavior of using normal data to conduct abnormal decision-making operations during the game. For example, under normal operating conditions, there is an obstacle between this game object and another game object, and consequently it is difficult to achieve a successful shooting action, or a distance between this game object and another game object is too large, and consequently it is difficult to achieve a successful shooting action. However, during the game in which the fraud behavior occurs, this game object has finished shooting at another game object.

It should be noted that the game object mentioned in the present invention can be understood as a game object operated by the currently monitored client, while another game object can be understood as a game object operated by another client, an AI game object of the game server, or a non-player object, etc. However, the game object can be a game character, or a game element other than the game character, such as a vehicle, an airdrop, and equipment.

For the above game fraud behavior, the present invention further proposes an anti-fraud method that prevents the game fraud behavior halfway, that is, during the game process, the decision-making behavior of the game object is monitored in real time, and it is determined whether a current game environment supports the decision-making behavior, and if the current game environment does not support the decision-making behavior, it is considered that there is a game fraud behavior. Generally, the anti-fraud method that prevents the game fraud behavior halfway is also carried out on the server side, but it does not exclude that the anti-fraud method that prevents the game fraud behavior halfway can also be carried out on the client side when the client side also obtains relevant permissions and is configured with relevant modules. For example, the field of view scene of this game object can be used as a part of the game scene to participate in the determining, the field of view scene is a game scene that the user can observe when operating the game object on the client, and if the game object performs a game action (such as shooting) on another game object that can be seen in the game scene, this game action that is, the decision-making behavior meets the occurrence condition. However, if there is an obstacle in the field of view scene, another game object behind the obstacle cannot be observed in the field of view scene of this game object, so that the game operation on the another game object is not supported, that is, the occurrence condition is not met, and if the game operation on the another game objects that cannot be observed is detected, it is determined that there is a fraud behavior.

After the fraud behavior is determined, a game account corresponding to the game object and the fraud behavior are recorded immediately. Furthermore, the game session can be terminated immediately, or other measures can be taken according to the seriousness of the fraud behavior.

Preferably, an area range of the field of view scene is an area range of a viewing cone of the game object, and an area within the area range of the viewing cone is considered to be the area that the player (that is, a customer) should see on a client display interface. Here, the game object may be a game character in the game, and the game character has an anthropomorphic field of vision, and a range of the field of view of the game character can be observed from a first perspective or a third perspective on the client.

Further, in the area of the viewing cone, if it is determined, through ray detection, that there is a blockage in a path between the game object and another game object, then such another game object is not displayed.

For example, if there is another game object in the bushes within the field of vision of this game object, this game object should not be able to see the another game object.

For another example, if this game object is outside the house and another game object is in the house, this game object outside the house should not be able to see the another game object in the house.

Preferably, the decision-making behavior of the game object includes a shooting behavior, a hitting behavior, a healing behavior, and so on.

Regarding the shooting behavior, in the present invention, it is determined, through ray detection, whether the path between the game object and another game objects is smooth, if the path is smooth, and a distance between the game object and another game object meets a shooting condition, it is considered that the shooting condition is met, and a shooting action can be completed; otherwise, if there is a blockage in the path between this game object and another game object or a distance between this game object and another game object does not meet a shooting condition, a shooting (hitting) behavior should not occur.

Usually, the determining of a decision-making behavior is determining performed only after the occurred decision-making behavior has occurred and when the decision-making behavior is detected. Therefore, after it is determined that the current game environment does not support the decision-making behavior, it can be determined that the decision-making behavior of the player is fraudulent.

Regarding the hitting behavior, whether a condition is met is usually determined according to a distance between the game object and another game object. If the distance between the game object and another game object exceeds a distance supported by the hitting behavior, it is considered there is a fraud.

Preferably, the ray detection process based on the voxel scene includes:

1) n points $(a_1, b_1, c_1), (a_2, b_2, c_2), \ldots, (a_n, b_n, c_n)$ through which a path formed by this game object $(x_1, y_1, z_1)$ and another game object $(x_2, y_2, z_2)$ passes in the voxel scene are obtained by calculation, that is, a ray is emitted from a starting point $(x_1, y_1, z_1)$ to an ending point $(x_2, y_2, z_2)$, and there is a line segment between the starting point and the ending point, and points on the line segment are the n points that need to be passed through.
2) In the GPU, calculation is simultaneously performed on the n points: a point corresponding to each point in the voxel scene is found by indexing according to the three-dimensional coordinates (x, y, z) in the voxel scene, and it is checked whether the corresponding point is a solid point. Specifically, each coordinate point in the voxel scene has an attribute value. If the attribute value is 1, it indicates that there is an object or a part of an object on the coordinate point, for example, objects such as a game character and a building occupy a large number of coordinate positions, the attributes of the coordinate points of these occupied positions are all 1, that is, solid points. Correspondingly, if the attribute value is 0, it indicates that there is no object on the coordinate point, that is, an open scene, that is, a hollow point.

3) If a solid point is detected among the n points, there is blockage in the path between this game object and another game object.

4) If no solid point is detected among the n points, the path between this game object and another game object is smooth.

Indexing can be understood as searching. When it is determined whether n points are solid points through detection, the n points first need to be "reached", and indexing is the step of "reaching". It can be understood as a proprietary step in computer processing.

In the world of voxel data, 1 represents a solid point, and 0 represents a hollow point. A representation of an object in the world of voxel data is a series of 1 at certain positions. To write an object means to write 1 to multiple certain positions in the world of voxel data; to erase an object means to write 0 to multiple certain positions in the world of voxel data.

In addition, the present invention applies voxel data to GPU ray detection, so that a high-speed multi-path concurrent operation can be implemented. It can be understood that, in the GPU, the time to detect multiple rays by using the voxel data is the same as the time to detect one ray. Therefore, the time to detect multiple rays can be greatly shortened. In this way, the calculation load on the server side is greatly reduced, so that it becomes possible to centrally place the calculation of game data of players on the server side.

In another embodiment, the voxel scene can further be another application scenario. In this another application scenario, the scene elements not only include terrain, vegetation, buildings and outdoor decorations, or may be other scene elements different from terrain, vegetation, buildings and outdoor decorations. Correspondingly, data export of the other scene elements and conversion of the voxel data may adopt a method different from this embodiment. This is not limited herein.

It should be noted that it does not mean that voxel data can only be used for calculations in the GPU. In a CPU, voxel data can still be used for calculation. However, when ray detection is performed, parallel calculation cannot be performed, and multiple-path detection tasks can only be executed sequentially.

The following provides an example of parallel implementation of single-path ray detection by a GPU:

1) n points $(a_1, b_1, c_1), (a_2, b_2, c_2), \ldots, (a_n, b_n, c_n)$ through which a path from a starting point $(x_1, y_1, z_1)$ to an ending point $(x_2, y_2, z_2)$ needs to pass in the voxel scene are calculated through a ray detection method. The ray detection method is performed as follows: A ray is sent from the starting point to the ending point, there is a line segment between the starting point and the ending point, and points on the line segment are the n points that need to be passed through.

2) The n points are put into an array A (the number of array elements is n, and each array element includes information about voxel scene coordinates, that is, information about three-dimensional coordinates (x, y, z)).

3) In the GPU, calculation is simultaneously performed on the points in the array A, that is, n threads are concurrent, and each thread performs the following process:

A point in voxel data is found by indexing according to the coordinates in the voxel scene, and it is detected whether the point is a solid point. If a solid point is detected, 1 is written to a result, that is, a first detection result, and it indicates that a path corresponding to the thread is blocked. If no solid point is detected, 0 is written to a result, that is, a second detection result, and it indicates that a path corresponding to the thread can be passed without an obstacle.

The following provides an example of a GPU implementing multiple-ray detection in parallel:

1) For m ray detection tasks, there are m pairs of starting points and ending points, and the m pairs of starting points and ending points are put into an array B (the number of array elements is m, and each array element includes a starting point and an ending point).

2) In the GPU, calculation is simultaneously performed on the pairs of starting points and ending points in the array B, that is, m parent threads are concurrent, and each thread executes the following process:

a. Ray detection is performed on the starting point $(x_1, y_1, z_1)$ and the ending point $(x_2, y_2, z_2)$;

b. n points $(a_1, b_1, c_1), (a_2, b_2, c_2), \ldots, (a_n, b_n, c_n)$ through which a path between the starting point and the ending point needs to pass through in the voxel scene are calculated by a ray detection method;

c. The n points are put into the array A' (the number of array elements is n, and each array element includes information about voxel scene coordinates, that is, information about three-dimensional coordinates (x, y, z));

d. In the GPU, calculation is simultaneously performed on the points in the array A, that is, n sub-threads are concurrent, and each sub-thread executes the following process (in this case, n sub-threads are concurrently executed for each parent thread, that is, a total of n*m threads): A point in voxel data is found by indexing according to the coordinates in the voxel scene, and it is detected whether the point is a solid point. If a solid point is detected, 1 is written to a result, and it indicates that a path corresponding to the sub-thread is blocked. If no solid point is detected, 0 is written to a result, and it indicates that a path corresponding to the sub-thread can be passed without an obstacle.

3) m ray detection results are collected.

In the present invention, measurement is performed on the processor RTX3090 and AMD threadriper 3990X: when 1 million or more ray detections are simultaneously performed, a detection speed of the GPU is about 550 times faster than a single-core CPU, and a computing speed is significantly improved.

In the voxel scene, dynamic programming is usually required to calculate a navigation task, and an output result is a path. In a dynamic programming task, multiple nodes to be explored are included. It should be noted that this node is a node in the sense of the task process, and does not represent a specific reference in the data. In some embodiments, the node may be a specific voxel scene coordinate point. For dynamic programming, the nodes are sequentially explored. When the nodes are explored, it is unknown whether ray detection is required and ray detection needs to be performed on which targets, and therefore a time sequence task is formed. In the present invention, a parallelization time dispersion task can be performed by using the GPU:

1) A detection area used by dynamic programming is estimated.

2) Ray detection is performed on all nodes in the detection area and all detection targets on which ray detection needs to be performed at each node. Assuming that there are x detection targets and y nodes, there are x*y paths, that is, a total of x*y parallel detection tasks. The detection target may be a voxel scene coordinate point, such as a target object in the game world or a coordinate point on the exterior of a scene building.
3) Detection results are saved.
4) When a dynamic programming algorithm is executed, only the already calculated detection results need to be queried.

Because the storage space occupied by storing the ray detection results of the specified detection area is very small, one result occupies one byte at most, and 1 million detection results can be stored in 1 MB, efficiency of executing the task by using the dynamic programming algorithm in the present invention is relatively high, and only a reading time is needed.

Preferably, there is also a need to simultaneously perform dynamic programming on multiple detection subjects, and the detection subject includes multiple detection targets, that is, simultaneously perform ray detection on x*y paths of the detection areas corresponding to different detection targets, and detection results are saved, and a detection result table is formed by division of detection areas. When a detection area is dynamically planned, a detection result of the detection area can be retrieved from the detection result table.

For example, if dynamic programming needs to be performed for an area A, an area B, an area C, and an area D, ray detection is simultaneously performed on x*y paths in each area, and the detection time is only a single ray detection time t.

Detection results are saved, a detection result of the area A is a, a detection result of the area B is b, a detection result of the area C is c, a detection result of the area D is d, and a detection result table of A-a, B-b, C-c, D-d is formed. When dynamic programming is performed on the area A, the result a is retrieved.

Regardless of whether there are multiple detection targets or multiple detection subjects, the ray detection time is only a single ray detection time t. Reading is performed in time subsequently in the actual process of dynamic programming, and the computing speed is very fast.

Preferably, the game object often has a displacement during the game, that is, positions of the game object are different at different times. The game object is called a dynamic game object here, and voxel data of a dynamic game object in the field of view scene needs to be refreshed according to a preset cycle. The field of view scene that game object should obtain at the current time is calculated on the server side, including:

1) Types of all dynamic game objects and offset coordinates of a contour point of each type of dynamic game objects relative to the center point of the game object are obtained in the field of view scene.
2) Updated coordinates of the refreshed contour point are obtained by calculation according to the offset coordinates of the center point of the dynamic game object and the contour point at the end of the latest preset period.
3) The updated coordinates of all contour points after the dynamic game object is refreshed are written into voxel data, and the voxel data of the original positions of all contour points are erased before the dynamic game object is refreshed, and dynamic refreshing of all game objects in the field of view scene is completed, so that the field of view scene after calculation and refreshing is obtained.

The coordinates of the contour points are the coordinates of the contours that make up the object, and the writing voxel data of the object is to write 1 at the positions of multiple contour points.

For example, if coordinates of the center point of an airdrop in the game are (10.10.30), and coordinates of one of the contour points of the airdrop are (0.20.50), offset coordinates of the contour point relative to the center point are (−10.10.20). If coordinates of the center point of the dynamic game object after refreshing are (10.10.25), coordinates of the contour point after refreshing is (0.20.45). 1 is written at the position (0.20.45) of the refreshed contour point, and 0 is written at the original position (0.20.50). If multiple contour points that make up the airdrop are simultaneously refreshed, the refreshing of the position of the airdrop is implemented.

By using voxel data, even global erasing and writing can be implemented in parallel on the GPU, and real-time refreshing of the voxel scene can be completed at a high speed at the level of 10 microseconds (0.01 milliseconds). In other embodiments of the present invention, all dynamic game objects in the entire game may be refreshed according to a preset period, and corresponding data are delivered to different clients according to the field of view scenes of different game objects.

The dynamic game objects can be all game objects that may move, such as game characters, vehicles, and airdrops.

Preferably, in addition to determining decision-making behaviors such as shooting behaviors, hitting behaviors, and healing behaviors, fraud behaviors can further be determined by determining whether the route taken by the game object and the traveling manner are compliant. Specifics are as follows:

1) A navigation path and a travelling manner between the game object and the destination are obtained by calculation; the number of navigation paths is one or multiple, and the number of traveling manners is one or multiple.
2) It is determined whether the navigation path includes an actual walking path of the game object, and it is determined whether the traveling method supported on the actual walking path include a traveling manner actually adopted by the game object, and if not, it is considered that there is a fraud behavior of the game object.

For example, the game object is on flat ground, and the destination is a house on a cliff. If a straight line (that is, a navigation path) is taken, the destination needs to be reached by using the equipment to jet (fly) (that is, a travelling manner); if a detour is taken to go a curve (that is, a navigation path), the destination can be reached by walking (that is, a traveling manner). That is: the straight-line path only supports a traveling manner of jetting (flying), and the curved path supports traveling manners such as walking, jumping, and jetting (flying). If it is detected that the game object reaches the house by walking in a straight line and does not have equipment to jet (fly), it can be determined that there is a fraud behavior for the game object.

For another example, this game object is by the river, and the destination to go is the other side of the river. The game sets that the river is relatively deep, only taking water vehicles, or jetting (flying) is supported to go to the other side of the river, and passing without using any water vehicle or equipment is not supported by the character. If it is detected that the game character passes through the river without using any water vehicle or equipment, it is considered that there is a fraud behavior.

For another example, if it is set that the game object consumes an energy value of s after moving a certain distance, but it is actually detected that the energy value consumed by the game object after moving a certain distance is less than s, it is considered that there is a fraud behavior for the game object.

Preferably, obtaining of the navigation path and the traveling manner between the game object and the destination by calculation is based on the layer data of the voxel scene and the connection data between the layer data and the layer data, and specifically includes the following:

1) In a x, y, z three-dimensional space of the voxel scene, a base plane where z=z' is taken, and there are multiple base points (x, y, z') on the base plane. The base point is taken as the bottom point, the z coordinate of the basic point as the height, multiple base columns are formed, and there are L element points (x, y, z) on each base column.
2) All base columns are accessed in parallel in the GPU, and each element point on the base column is traversed in each parallel thread, and a voxel scene coordinate point corresponding to the element point is found by indexing according to the voxel data, and it is determined whether the scene coordinate point is a hollow point or a solid point.
3) Continuous hollow point segments on each base column are collected. If the height of the continuous hollow point segments is greater than or equal to a first preset height, the continuous hollow point segments are defined as a voxel layer.
4) A positional relationship between the voxel layer on which the game object is currently located and each voxel layer on the adjacent base column is obtained by calculation, so that a way of travelling between the voxel layer on which the game object is currently located and each voxel layer on the adjacent base column is obtained.

The present invention further discloses a data processing system based on voxel data. Original data of a game scene constitutes a pixel scene, and the pixel scene includes multiple different data types of scene elements. The system includes:

an exporting module, configured to export original data of multiple types of scene elements respectively;

a conversion module, configured to: set an expected side length of a unit voxel, and combined with the side length of the unit voxel, convert the original data of the multiple types of scene elements into voxel data respectively, where the voxel data is expressed as a voxel module in the voxel scene; and a splicing module, configured to: according to relative positions of the voxel modules of all the scene elements in the pixel scene, splice the voxel modules of all the scene elements to obtain a voxel scene.

The system includes a hardware structure and a computer-readable storage medium. The above functional modules may be integrated on the hardware structure or may be integrated on the computer-readable storage medium. This is not limited herein. Moreover, the connection relationship of the above functional modules may be a tangible connection or an intangible cross-region connection. This is not limited herein. In addition, the system and corresponding method embodiments belong to the same idea. For details of a specific implementation process, refer to the corresponding method embodiments. Details are not repeated herein.

The present invention further discloses a data processing server based on voxel data. Original data of a game scene constitutes a pixel scene, the pixel scene includes multiple different data types of scene elements, and the server includes:

an exporting module, configured to export original data of multiple types of scene elements respectively;

a conversion module, configured to: set an expected side length of a unit voxel, and combined with the side length of the unit voxel, convert the original data of the multiple types of scene elements into voxel data respectively, where the voxel data is expressed as a voxel module in the voxel scene; and a splicing module, configured to: according to relative positions of the voxel modules of all the scene elements in the pixel scene, splice the voxel modules of all the scene elements to obtain a voxel scene.

In addition, the server and corresponding method embodiments belong to the same idea. For details of a specific implementation process, refer to the corresponding method embodiments. Details are not repeated herein.

The present invention further discloses a computer-readable storage medium for storing a data processing instruction based on voxel data. Original data of a game scene constitutes a pixel scene, and the pixel scene includes multiple different data types of scene elements, and the following steps are implemented when the instruction is executed:

exporting original data of multiple types of scene elements respectively;

setting an expected side length of a unit voxel, and combined with the side length of the unit voxel, converting the original data of the multiple types of scene elements into voxel data respectively, where the voxel data is expressed as a voxel module in the voxel scene; and according to relative positions of the voxel modules of all the scene elements in the pixel scene, splicing the voxel modules of all the scene elements to obtain a voxel scene.

The computer-readable storage medium can be integrated in hardware, and when the hardware is run, the computer-readable storage medium can be supported to read and run.

In addition, the computer-readable storage medium and the corresponding method embodiments belong to the same idea. For details of a specific implementation process, refer to the corresponding method embodiments. Details are not repeated herein.

The present invention further discloses a computer program product, including a computer executable instruction, and the instruction is executed by a processor to implement the following steps:

exporting original data of multiple types of scene elements respectively;

setting an expected side length of a unit voxel, and combined with the side length of the unit voxel, converting the original data of the multiple types of scene elements into voxel data respectively, where the voxel data is expressed as a voxel module in the voxel scene; and according to relative positions of the voxel modules of all the scene elements in the pixel scene, splicing the voxel modules of all the scene elements to obtain a voxel scene.

In addition, the computer program product and the corresponding method embodiments belong to the same idea. For details of a specific implementation process, refer to the corresponding method embodiments. Details are not repeated herein.

It should be noted that the embodiments of the present invention have better implementations and do not limit the present invention in any form. Any person skilled in the art may use the technical content disclosed above to change or modify equivalent effective embodiments. However, any amendments or equivalent changes and modifications made to the above embodiments based on the technical essence of the present invention without departing from the content of the technical solution of the present invention still fall within the scope of the technical solution of the present invention.

The invention claimed is:

1. A data processing method based on voxel data, wherein original data of a game scene constitutes a pixel scene, and the pixel scene comprises multiple different data types of scene elements, and the data processing method comprises:

exporting the original data of the multiple different data types of scene elements respectively;

setting an expected side length of a unit voxel, and combined with the expected side length of the unit voxel, converting the original data of the multiple different data types of scene elements into voxel data respectively, wherein the voxel data in a voxel scene is represented as a voxel module;

according to relative positions of voxel modules of all the scene elements in the pixel scene, splicing the voxel modules of all the scene elements to obtain the voxel scene, obtaining a voxel area within a target space range of a target object by clipping in the voxel scene, and using the voxel area as an input of a neural network in the form of a three-dimensional tensor, to obtain spatial features of the target object, wherein the obtaining a voxel area within a target space range of a target object by clipping, and the using the voxel area as an input of a neural network in the form of a three-dimensional tensor, to obtain spatial features of the target object comprises:

taking the target object as a center, obtaining a voxel cube in a surrounding space range of the target object by clipping, and using the voxel cube as an input of a neural network in the form of a three-dimensional tensor, to obtain spatial features surrounding the target object.

2. The data processing method according to claim 1, wherein each scene element comprises at least one of terrain, vegetation, a building and an outdoor decoration;

the exporting the original data of the multiple different data types of scene elements respectively comprises:

exporting 3D model file format data and coordinate information of the outdoor decoration and the building;

exporting comma-separated value file format data of the vegetation; and orthogonally capturing by a depth camera to export a picture of the terrain, wherein the picture comprises surface height data of the terrain.

3. The data processing method according to claim 2, wherein the setting an expected side length of a unit voxel, and combined with the expected side length of the unit voxel, the converting the original data of the multiple different data types of scene elements into voxel data respectively comprises:

converting the 3D model file format data of the outdoor decoration and the building into voxel data using a "read_triangular_mesh" function and a "create_from_triangular_mesh" function in an open-source library;

obtaining a size of a collision body of the vegetation, combined with the expected side length of the unit voxel, obtaining a quantity of voxels that the vegetation needs to occupy in the voxel scene and a voxel shape by calculation; and according to the picture in which the surface height data of the terrain is stored, performing sampling point by point according to the expected side length of the unit voxel to convert the surface height data of the terrain into voxel data.

4. The data processing method according to claim 1, wherein the obtaining a voxel area within a target space range of a target object by clipping, and the using the voxel area as an input of a neural network in the form of a three-dimensional tensor, to obtain spatial features of the target object comprises:

in a front space range of the target object, obtaining a first voxel cuboid by clipping, and using the first voxel cuboid as an input of the neural network in the form of a three-dimensional tensor, to obtain spatial features in front of the target object, and in the front space range of the target object, obtaining a second voxel cuboid by clipping, wherein a length of the second voxel cuboid is much greater than a length of the first voxel cuboid, and using the second voxel cuboid as an input of the neural network in the form of a three-dimensional tensor, to obtain spatial features far in front of the target object.

5. The data processing method according to claim 1, wherein the obtaining a voxel area within a target space range of a target object by clipping, and the using the voxel area as an input of a neural network in the form of a three-dimensional tensor, to obtain spatial features of the target object comprises:

using the voxel data in the voxel scene for a specified target object and a field of view, obtaining a depth map with a resolution of M*N through ray detection, and using the depth map as an input of the neural network to obtain spatial features of the target object.

6. The data processing method according to claim 5, wherein the using the voxel data in the voxel scene for a specified target object and a field of view, and the obtaining a depth map with a resolution of M*N through ray detection comprises:

generating a viewing cone in a direction of the field of view, wherein an end of the viewing cone is a curved surface, and the curved surface comprises M*N points in the voxel scene; and taking the target object as a starting point and taking the M*N points as ending points to form M*N paths, and performing ray detection on the M*N paths along a direction from the starting point to the ending point until a solid point in the path is detected; wherein detection results of the M*N paths constitute the depth map.

7. The data processing method according to claim 6, wherein the performing ray detection on the M*N paths along a direction from the starting point to the ending point until a solid point in the path is detected comprises:

wherein each of M*N paths comprises a starting point and an ending point;

obtaining n points through which each of the M*N paths passes through in the voxel scene by calculation; and in a GPU, simultaneously performing calculation on the M*N paths, to find a point corresponding to each point in the voxel scene by indexing.

8. The data processing method according to claim 1, wherein the method further comprises:

determining whether there is a fraud in a behavior of a game object, wherein a game processing process of the game object is carried out in the voxel scene, the voxel scene comprises the game object and a field of view scene of the game object, and each client corresponds to one or more game objects, and the determining whether there is a fraud in a behavior of a game object comprises:

calculating, by a server side, the field of view scene that should be obtained by the game object at the current time, and sending the field of view scene to the client in real time;

based on a decision-making behavior that has occurred for the game object, determining whether the decision-making behavior meets an occurrence condition in the field of view scene, and if the occurrence condition is not met, considering that there is a fraud behavior; and recording a game account corresponding to the game object and the fraud behavior.

9. The data processing method according to claim 8, wherein an area range of the field of view scene is an area range of a viewing cone of the game object; and within the area range of the viewing cone, if it is determined, through ray detection, that there is a blockage in a path between the game object and another game object, then such another game object is not displayed.

10. The data processing method according to claim 8, wherein based on the decision-making behavior that has occurred for the game object, the determining whether the decision-making behavior meets an occurrence condition in the field of view scene comprises:

determining, through ray detection, whether a path between the game object and another game object is smooth, and if the path is smooth, the decision-making behavior meets the occurrence condition; or if the path is not smooth, the decision-making behavior does not meet the occurrence condition.

11. The data processing method according to claim 8, wherein the calculating the field of view scene that should be obtained by the game object at the current time comprises:

in the field of view scene, obtaining types of all dynamic game objects and offset coordinates of a contour point of each type of dynamic game object relative to a center point of the game object;

obtaining updated coordinates of a refreshed contour point by calculation according to the offset coordinates of the center point of the dynamic game object at an end of a latest preset period and the contour point; and writing the updated coordinates of all contour points into the voxel data after the dynamic game object is refreshed, erasing the voxel data of original positions of all contour points before the dynamic game object is refreshed, and completing dynamic refreshing of all game objects in the field of view scene, to obtain the field of view scene after calculation and refreshing.

12. The data processing method according to claim 8, wherein based on the decision-making behavior that has occurred for the game object, the determining whether the decision-making behavior meets an occurrence condition in the field of view scene, and if the occurrence condition is not met, considering that there is a fraud behavior comprises:

obtaining a navigation path and a traveling manner between the game object and a destination by calculation, wherein a quantity of navigation paths is one or more, and a quantity of traveling manners is one or more; and determining whether the navigation path comprises an actual walking path of the game object, determining whether the traveling manner supported on the actual walking path comprises a traveling manner actually adopted by the game object, and if not, considering that there is a fraud behavior.

13. The data processing method according to claim 12, wherein the obtaining a navigation path and a traveling manner between the game object and a destination by calculation comprises:

in a x, y, z three-dimensional space of the voxel scene, taking a base plane of z=z', wherein there are multiple base points on the base plane; forming multiple base columns by using a base point as a bottom point and using a z coordinate of the base point as a height, wherein there are L element points on each base column;

accessing all the base columns in parallel in a GPU, and traversing each element point on each base column in each parallel thread, and a voxel scene coordinate point corresponding to each element point is found by indexing according to the voxel data, and determining whether the voxel scene coordinate point is a hollow point or a solid point;

collecting continuous hollow point segments on each base column, and if a height of the continuous hollow point segments is greater than or equal to a first preset height, defining the continuous hollow point segments as a voxel layer; and obtaining a positional relationship between the voxel layer on which the game object is currently located and each voxel layer on an adjacent base column by calculation, to obtain a traveling manner between the voxel layer on which the game object is currently located and each voxel layer on the adjacent base column.

14. The data processing method according to claim 1, further comprising a step of determining through ray detection which comprises:

obtaining, by calculation, n points $(a_1, b_1, c_1)$, $(a_2, b_2, c_2)$, . . . , $(a_n, b_n, c_n)$ through which a ray path passes in the voxel scene, wherein the ray path is formed by a game object $(x_1, y_1, Z_1)$ and another game object $(x_2, y_2, Z_2)$;

in a GPU, simultaneously performing calculation on the n points: finding n points in the voxel scene by indexing according to coordinates in the voxel scene, and checking whether the n points are solid points; and if it is detected that there is a solid point in the n points, then there is a blockage in the a between the game object and another game object; if it is detected that there is no solid point in the n points, then the path between the game object and another game object is smooth.

15. The data processing method according to claim 14, wherein the step of determining through ray detection further comprises: performing ray detection on m paths in the GPU:

wherein the m paths comprise m starting points and m ending points; simultaneously performing calculation on and obtaining the n points through which each ray path passes in the voxel scene;

simultaneously performing calculation on the n points in the m paths: finding a point corresponding to each point in the voxel scene by indexing according to the coordinates in the voxel scene, and detecting whether the corresponding point is a solid point; and if it is detected that there is a solid point among the n points, there is a blockage in the path;

otherwise, the path is smooth, to obtain detection results of the m paths.

16. The data processing method according to claim 15, further comprising:

wherein a detection area comprises x detection targets and y nodes, performing dynamic programming on the detection area, comprising:

simultaneously performing ray detection on x*y paths formed by the x detection targets and y nodes, and saving detection results; and retrieving the detection results of different paths at different times for the detection area to perform the dynamic programming.

17. The data processing method according to claim 16, further comprising:

performing dynamic programming for multiple detection areas which comprises:

simultaneously performing ray detection on x*y paths in different detection areas, and saving the detection results to form a detection result table obtained by division of the multiple detection areas; and when dynamic programming is performed on a detection area, retrieving the detection result of the detection area from the detection result table.

18. A data processing server based on voxel data, wherein original data of a game scene constitutes a pixel scene, and the pixel scene comprises multiple different data types of scene elements, and the data processing server comprises:

an exporting module, configured to export original data of multiple different data types of scene elements respectively;

a conversion module, configured to: set an expected side length of a unit voxel, and combined with the expected side length of the unit voxel, convert the original data of multiple different data types of scene elements into voxel data respectively, wherein the voxel data is represented as a voxel module in a voxel scene; and a splicing module, configured to: splice the voxel modules of all the scene elements according to relative positions of the voxel modules of all the scene elements in the pixel scene to obtain the voxel scene, wherein one or more modules of the data processing server are configured to:

obtain a voxel area within a target space range of a target object by clipping in the voxel scene, and use the voxel area as an input of a neural network in the form of a three-dimensional tensor, to obtain spatial features of the target object, wherein to obtain a voxel area within a target space range of a target object by clipping, and to use the voxel area as an input of a neural network in the form of a three-dimensional tensor, to obtain spatial features of the target object, the one or more modules of the data processing server are further configured to:

take the target object as a center, obtain a voxel cube in a surrounding space range of the target object by clipping, and use the voxel cube as an input of a neural network in the form of a three-dimensional tensor, to obtain spatial features surrounding the target object.

19. A non-transitory computer-readable storage medium for storing a data processing instruction based on voxel data, wherein original data of a game scene constitutes a pixel scene, and the pixel scene comprises multiple different data types of scene elements, and when the instruction is executed, the following steps are performed:

exporting original data of multiple different data types of scene elements respectively;

setting an expected side length of a unit voxel, and combined with the expected side length of the unit voxel, converting the original data of multiple different data types of scene elements into voxel data respectively, wherein the voxel data in a voxel scene is represented as a voxel module;

according to relative positions of the voxel modules of all the scene elements in the pixel scene, splicing the voxel modules of all the scene elements to obtain the voxel scene, obtaining a voxel area within a target space range of a target object by clipping in the voxel scene, and using the voxel area as an input of a neural network in the form of a three-dimensional tensor, to obtain spatial features of the target object, wherein the obtaining a voxel area within a target space range of a target object by clipping, and the using the voxel area as an input of a neural network in the form of a three-dimensional tensor, to obtain spatial features of the target object comprises:

taking the target object as a center, obtaining a voxel cube in a surrounding space range of the target object by clipping, and using the voxel cube as an input of a neural network in the form of a three-dimensional tensor, to obtain spatial features surrounding the target object.

20. A computer program product, comprising a computer-executable instruction, wherein the instruction is executed by a processor to implement the following steps:

exporting original data of multiple types of scene elements respectively;

setting an expected side length of a unit voxel, and combined with the expected side length of the unit voxel, converting the original data of the multiple types of scene elements into voxel data respectively, wherein the voxel data in a voxel scene is represented as a voxel module;

according to relative positions of the voxel modules of all the scene elements in the pixel scene, splicing the voxel modules of all the scene elements to obtain the voxel scene, obtaining a voxel area within a target space range of a target object by clipping in the voxel scene, and using the voxel area as an input of a neural network in the form of a three-dimensional tensor, to obtain spatial features of the target object, wherein the obtaining a voxel area within a target space range of a target object by clipping, and the using the voxel area as an input of a neural network in the form of a three-dimensional tensor, to obtain spatial features of the target object comprises:

taking the target object as a center, obtaining a voxel cube in a surrounding space range of the target object by clipping, and using the voxel cube as an input of a neural network in the form of a three-dimensional tensor, to obtain spatial features surrounding the target object.

* * * * *